United States Patent [19]

Precin et al.

[11] 3,778,560

[45] Dec. 11, 1973

[54] MAGNETIC TRANSDUCING HEAD AND DRUM ASSEMBLY WITH HEAD INSERTABLE RADIALLY INTO A SLOT IN DRUM FOR ALIGNMENT

[75] Inventors: Raymond J. Precin, Des Plaines; Robert T. Mattoon, Hanover Park, both of Ill.

[73] Assignee: Ampex Corporation, Redwood City, Calif.

[22] Filed: Oct. 12, 1971

[21] Appl. No.: 188,203

[52] U.S. Cl... 179/100.2 T, 178/6.6 A, 346/174.1 F

[51] Int. Cl. .......... G11b 5/10, G11b 5/50

[58] Field of Search .......... 178/6.6 A; 179/100.2 C, 100.2 CA, 100.2 T; 340/174.1 F; 346/74 MC

[56] References Cited

UNITED STATES PATENTS

| | | | |
|---|---|---|---|
| 3,207,517 | 9/1965 | Tanigawa et al. | 179/100.2 T |
| 3,076,060 | 1/1963 | Horstkorta | 179/100.2 T |
| 3,046,359 | 7/1962 | Warren | 179/100.2 T |
| 3,164,683 | 1/1965 | King et al. | 179/100.2 T |
| 3,020,359 | 2/1962 | Pfost | 179/100.2 T |
| 3,422,230 | 1/1969 | Tanigawa et al. | 178/6.6 A |
| 3,378,647 | 4/1968 | Hirota | 340/174.1 F |
| 3,412,217 | 11/1968 | Bygdnes | 179/100.2 T |
| 3,365,709 | 1/1968 | Gooch | 340/174.1 F |
| 2,922,231 | 1/1960 | Witt et al | 340/174.1 F |
| 3,590,168 | 6/1971 | Gooch | 179/100.2 T |
| 3,303,292 | 2/1967 | Bedell, Jr., et al | 179/100.2 T |

*Primary Examiner*—Vincent P. Canney
*Assistant Examiner*—Alfred H. Eddleman
*Attorney*—William E. Anderson et al.

[57] ABSTRACT

A magnetic transducing head is precisely located with respect to a circumferential wall of a rotating drum of a magnetic recording and reproducing apparatus and is located at a predetermined angular position on the drum and in plane perpendicular to the rotational axis of the drum. A radially directed slot is formed in the drum to slideably accept the transducing head which has a pole piece tip preset to project for a predetermined distance from the circumferential wall when a reference surface on the magnetic head is aligned with a reference surface on the drum. Preferably, the reference surface on the transducing head is a curved outer wall having the same radius of curvature as the circumferential wall for alignment with the latter to locate the tip precisely beyond the circumferential wall to engage the magnetic tape with a preferred head-to-tape contact pressure. Other slideably engaged surfaces on the transducing head and the slot align with the head at its predetermined angular position and in the plane perpendicular to the axis of the drum.

4 Claims, 6 Drawing Figures

MAGNETIC TRANSDUCING HEAD AND DRUM ASSEMBLY WITH HEAD INSERTABLE RADIALLY INTO A SLOT IN DRUM FOR ALIGNMENT

This invention relates to a magnetic transducing head and drum assembly for use in a magnetic recording and reproducing apparatus in which the magnetic transducing head is turned by the drum into contact with the magnetic tape engaging the drum.

It has been recognized that the control of head-to-tape contact in a magnetic tape recording and reproducing apparatus of this kind is extremely important especially for recording and reproducing high frequency signals, such as video signals. Poor or erratic contact between the magnetic head and the tape may result in loss, drop-out or distortion of signals and additionally may cause excessive wear of the magnetic head thereby shortening the life of the head.

One manner of positioning a magnetic transducer head to achieve good head-to-tape contact is disclosed in U. S. Pat. No. 3,401,236. As disclosed in this patent, a transducing head is positioned by pivoting it downwardly through an opening in a web for the drum and and forcing it against reference surfaces while sliding it radially outwardly through an opening in the drum circumferential wall to abut against a gauge. Often an indicator gauge was used to check the precise location, e.g., within a 0.001 inch tolerance, of the tip from the drum circumferential wall; and the drum was oscillated to swing the tip against the indicator gauge to ascertain the exact radial location of the pole piece tip relative to the circumferential wall and the drum axis.

Good results were achieved with the apparatus described in the aforementioned patent where strong metal pole piece tips were used in the transducing head; but when ferrite pole pieces are used for improved magnetic characteristics and wear rates, the tips are more prone to being damaged. More specifically, the ferrite pole pieces are extremely smaller, brittle and fragile and are subject to breaking or being damaged particularly when being installed by the end users of the equipment. Thus, end users who swung the ferrite pole piece tips against an indicator gauge with oscillation of the drum could fracture the more brittle ferrite pole pieces.

Additionally, the past practices of installation can result in the striking of the ferrite pole pieces against a portion of the drum when pivoting the transducing head downwardly through an opening in the web of the drum. Such striking may also fracture the ferrite pole pieces. Thus, there is a definite need for a quick and easy manner of installation and removal of magnetic transducer heads which would allow positioning of the head at the precise position without damage thereto. Additionally, the magnetic transducing head must be located in a precise angular position and in a plane perpendicular to the rotational axis of the drum.

U.S. Pat. No. 3,076,060 discloses a control means to shift a magnetic head and its pole piece tip to obtain the desired head-to-tape contact. More specifically, a rotatable knob and a spring biased rod move incrementally a carrier and the head thereon to project the tip against the tape or, as during a standby operation, to retract the tip from wearing engagement with the tape. However, such means are not needed with the long wearing ferrite pole pieces and because tape slackners release tape tension during standby.

Accordingly, an object of the present invention is to provide a new and improved positioning of a magnetic transducer head on a rotatable drum.

Other objects and advantages of the invention will become apparent from the following detailed description taken in connection with the accompanying drawings in which.

Figure 3:
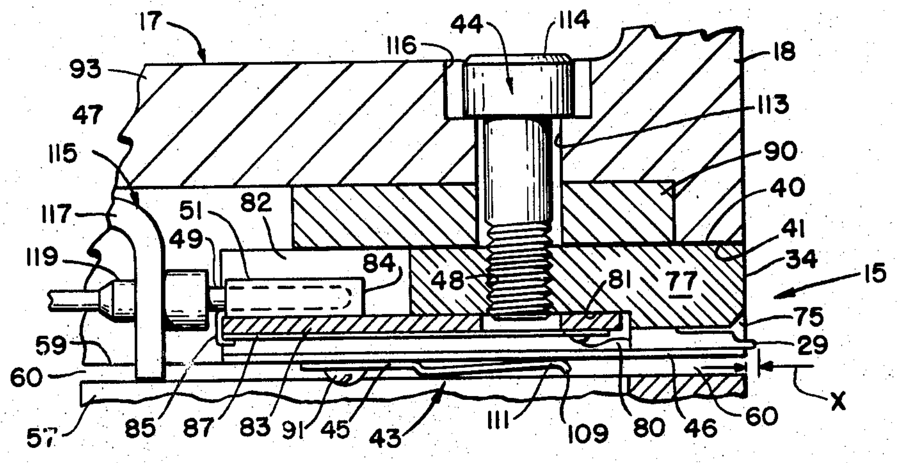
FIG. 3 is an enlarged cross-sectional view taken substantially along the line 3—3 of FIG. 2.

As shown in the drawings for purposes of illustration, the invention is embodied in a magnetic tape recording and reproducing apparatus 11 having a magnetic transducing head and drum assembly 12 comprised of one or more transducing heads 15 carried by a rotatable drum 17 having a circumferential wall 18 for contact with a magnetic tape 19 transported past the transducing head by a tape transport 21 for travel between a supply reel 23 and a takeup reel 25. As best seen in FIG. 3, a small pole piece tip 29 on the magnetic transducer head 15 must be positioned radially outwardly of the drum's circumferential wall 18 within a relatively precise dimension "$x$", e.g., between 0.0035 to 0.0045 inch in order that the proper head-to-tape contact be achieved. As will be explained in greater detail, the tip 29 causes a "tenting" of the magnetic tape and an air bearing is formed between the tape and the drum wall 18. While a pair of closely adjacent transducing heads 15 of identical construction are illustrated, only one head will be described in detail and will afford an understanding of the other head.

When positioning a pole piece tip in the manner disclosed in U.S. Pat. No. 3,401,236, the pole piece was projected downwardly through an opening in a web in the drum and projected outwardly through the cylindrical wall of the drum to contact a gauge. Often, to assure the position of the tip within one thousandth of an inch, the tip was swung past a stationary indicator gauge. However, with the introduction of ferrite pole piece tips, it was found that the tips were being fractured when being inserted in the manner disclosed in the aforementioned patent and being gauged as to the position thereof. Thus, there was a need for a simlified manner of precisely positioning magnetic transducer heads having pole pieces in a rotatable drum.

In accordance with the present invention, the transducing head 15 and its pole piece tip 29 are precisely located with respect to the drum 17 in three different directions, namely: at a predetermined radial distance from a rotational axis 31 for the drum, in a predetermined angular position on the drum, and in a plane perpendicular to the rotational axis of the drum. This is achieved by shaping the magnetic transducing head with reference surfaces thereon and presetting the tip 29 at a precise determined distance from one of its references and sliding the head into a radially extending slot 30 formed in the rotatable drum having cooperating reference surfaces for engagement and/or alignment with the transducing head reference surfaces. More specifically, the tip 29 of the pole piece is preset to project outwardly from a first reference surface on the magnetic head preferably in the form of a curved wall 34 having the same radius of curvature as the circumferential wall 18 of the drum. Thus, by pressing the transducing head inwardly into the slot until the curved walls 18 and 34 are aligned, it is possible by merely feeling the alignment of the curved walls with one's finger tips to have the tip 29 located within 0.001 inch of the drum circumferential wall 18 and thereby provide the desired head-to-tape contact pressure during the operation of the apparatus.

The transducing head is located in a precise angular position on a drum 17 by reference surfaces in the form of side walls 36 and 37 on the transducing head 15 sliding along and in engagement with reference surface in the form of side walls 38 and 39 on the radially extending slot 30. The tip is located precisely in a plane perpendicular to the rotational axis of the drum when top reference surface in the form of a top wall 40 on the transducing head 15 abuts and slides along an upper reference surface in the form of a top wall 41 of the slot 30. As the scanner assembly is open, when the magnetic tape 19 is removed, it is a simple manner to insert the transducing head into the slot and push the head inwardly with reference surface walls 36, 37 and 40 sliding along reference surface walls 38, 39 and 41 of the slot 30 until the curved reference surface wall 34 of the head is aligned with the curved circumferential drum wall 18. The tip 29 will thereby be positioned at a predetermined projecting distance from the circumferential wall of the drum. This will provide the proper tenting of the tape and aid in attaining good performance during operation of the apparatus.

Figure 6:
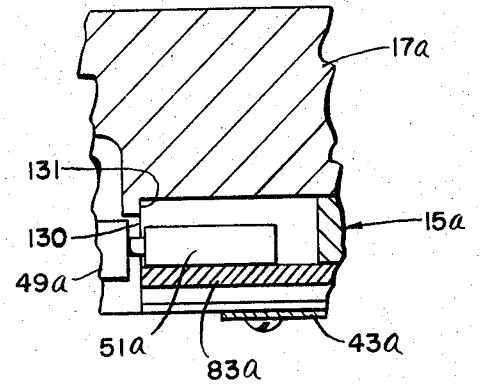
FIG. 6 is a fragmentary illustration of another embodiment of the invention.

To allow an infinite adjustment of the transducing head 15 in the radial direction in the slot 30 and to hold the head at the precise position, a locking means 43 comprises a leaf spring 45 which, as best seen in FIGS. 3 and 6, bears on underside 46 of the transducing head and presses the top reference wall 40 tightly against the top reference wall 41 of the slot 30. The locking means further comprises a screw 44 (FIG. 3) carried by the drum 17 and threaded into a threaded hole 48 in the transducing head. The spring 45 holds the transducing head temporarily at the reference radial position until the screw is tightened to lock permanently the transducing head against outward movement due to centrifugal force or inward movement by the magnetic tape 19 pushing thereon. As the leaf spring is merely deflected downwardly and applies only an upward force, it doesn't apply any turning torque to twist the transducing head as has been the case with some screw locks used in the prior art to hold the transducing head.

Also, in accordance with the present invention, the transducing head 15 may be provided with slidable electrical connectors 47 for establishing an electrical circuit between the transducing head and other circuitry (not shown) for the magnetic recording apparatus. In this instance, the scanner drum is provided with pin connectors 49 and receiver or slot connectors 51 which establish electrical contact prior to the full insertion of the head into the aligned position so that electrical connection will be maintained with movement of the transducing head to its final adjusted position. The pin and slot connectors provide a rigid interconnection and eliminate some of the problems heretofore experienced by use of flexible wires and solder connections which sometimes break in use.

Referring now in greater detail to the specific illustrative apparatus, the tape transport 21 is one of several kinds which may be used and hence will only be briefly described. The tape transport includes the supply reel 23 and a take-up reel 25 which are mounted for rotation upon a tape deck 53 at spaced locations thereon. The supply reel is mounted on the deck proper while the take-up reel is mounted on a raised support portion 55 so as to be elevated with respect to the supply reel, for the purposes subsequently described. The supply reel and the take-up reel are coupled to electric drive motors (not shown) in the conventional manner. The motors are arranged to maintain tape tension and to wind the tape on the take-up reel during record or reproduce operations.

The length of the tape 19 extending between the reels 23 and 25 is wrapped helically about a lower drum 57 which is cylindrical and coaxial with the upper rotating drum 17 and together these drum comprise a scanning assembly 58. The lower drum 57 is fixedly supported on the tape deck 53 and the upper drum 17 is mounted for rotation and is rotated at a very high speed by a drive motor (not shown) supported by the tape deck. The magnetic transducing head 15 is mounted at a lower rim 59 for the upper drum 17 and the tip 29 thereon extends radially outwardly of the drum at a gap 60 between the drums 17 and 57.

In order to facilitate driving and guidance of the tape helically about the scanning assembly 58, a tape driving capstan 61 is rotatably mounted on the deck 53 in forward spaced, parallel relationship to the scanning assembly 58. Cylindrical entrance and exit guides 62 and 63, which are parallel to the axis to the capstan, are mounted on the deck between the capstan and scanning assembly and on opposite sides of a line extending between the scanning assembly and the capstan axis. In addition a pair of retractable tape guides 64 and 66 are slidably mounted on the deck on opposite sides of the line between the capstan and the scanning assembly axis at points between the guides 62 and 63 and the scanning assembly.

Figure 1:
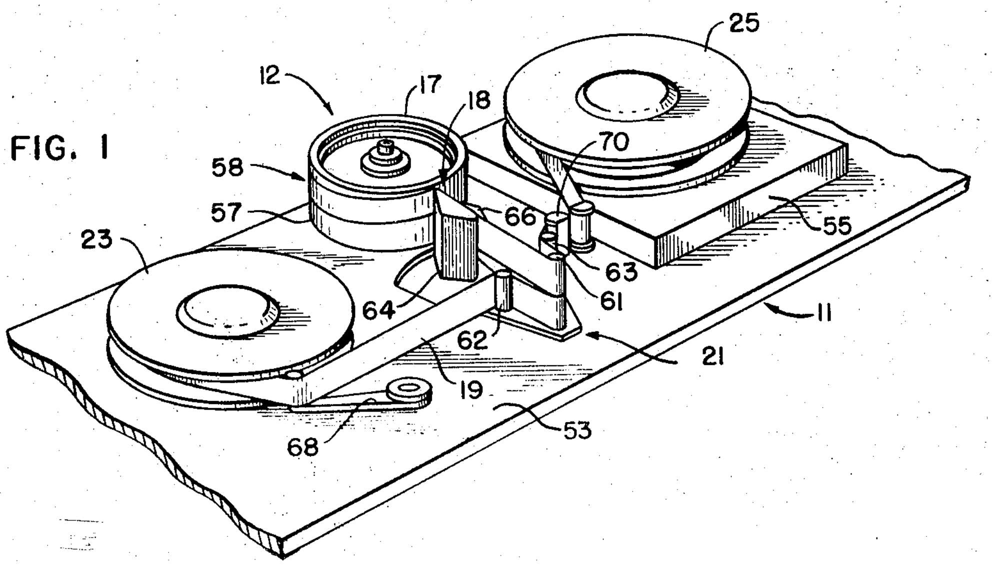
FIG. 1 is a fragmentary perspective view of a magnetic recording and reproducing apparatus in which the present invention may be employed.

As shown in FIG. 1, the tape 19 leaving the supply reel 23 is engaged by a tape tension arm 68, extends about a first guide 62, extends around a lower portion of the capstan 61, about a downwardly tapered lowered half of the right hand or entrance guide 66, and tangentially upon the lower cylindrical drum 57 of the scanning assembly. By virtue, the shape of the entrance guide 66, the tape 19 is twisted slightly to slant the lower half thereof outwardly from the line between the capstan and the drum axis. This twist causes the tape entering the scanning assembly 58 to traverse in an upward path as it extends approximately 360° around the drums 57 and 17 to the exit guide 64. The tape 19 thus extends about the scanning assembly 58 in a helical path. The taper of the entrance guide 66 is selected moreover to impart a pitch to the helical path which positions substantially the entire width of the tape over the upper drum 17 at a point adjacent to the left hand or exit guide 64. The tape then tangentially leaves the upper drum 17 to extend around the left exit guide 64. The exiting tape extends around an upwardly tapered upper half of the exit guide around the upper portion of the capstan 61, about the fixed guide 63 and onto the take up reel 25. The taper of the upper half of the exit guide 64 is equal, but opposite, to that of the entrance guide 66 such that the tape 19 is twisted to slant the upper edge thereof outwardly from a line between the drum and the capstan axis by an amount equal to the outward slant of the lower edge arising from the original twist effecting the helical path. Thus, the exiting tape is returned to a path lying in a plane parallel to the deck 53 before it reaches the upper portion of the capstan 61 such that the tape extends uniformly about the capstan as directed uniformly upon the take up reel 25 without kinking or twisting. As previously noted by virtue of the helical path, the tape 19 rises in passing around the drums 57 and 17 and it is for this reason that the take up reel is mounted in an elevated position on the raised portion of the deck 53. A tape timer 70 is disposed between the capstan and the take up reel.

Although the guidance arrangement of the tape transport 22 illustrated in drawings herein described, it is such that it provides an Omega helical path about the scanning assembly 58, it is noted that this specific form of path is purely exemplary and that other helical paths extending 360° or more or substantially less than 360° may be employed with the invention by appropriate modification and tape guidance system. A 180° wrap may, for example, be employed with two heads mounted in diametrically opposite points at diametrically opposite points on a head drum.

Figure 5:
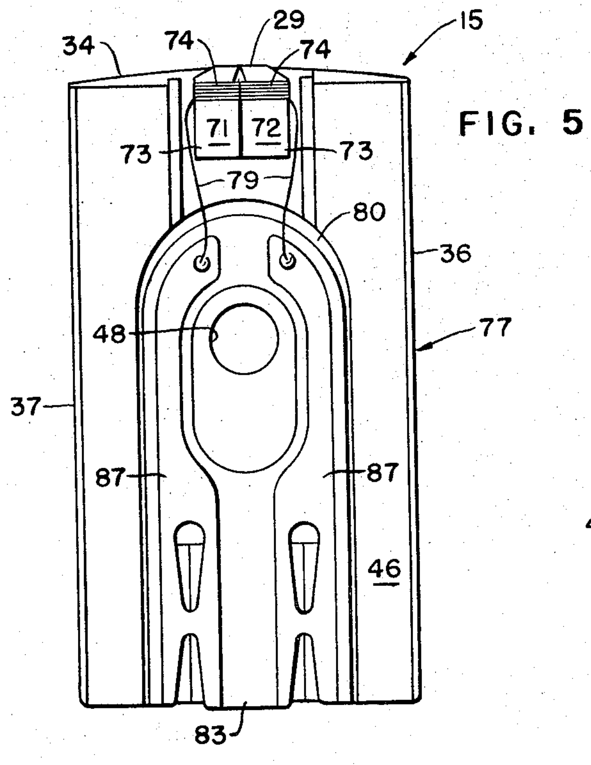
FIG. 5 is an enlarged bottom view of one of the magnetic transducing heads shown in FIG. 2.

Referring now in greater detail to the plug-in head 15, it is formed with pole pieces 71 and 72, as best seen in FIG. 5, which are preset to project from the reference surface 34 at a predetermined distance such as, for example, between 0.0035 to 0.0045 inch. Each pole piece includes a central body 73 each having winding 74, e.g., three turns of wire thereabout with the wires extending radially inwardly for electrical connection to the scanner assembly 58 as will be described hereinafter. To allow the positioning of the pole pieces above a lower rim 59 of the rotatable drum 17, the pole pieces are received in an upwardly extending groove 75 of a block-shaped body 77 for the transducer head. The pole pieces are secured in the channel as by means of a suitable adhesive, for example, an epoxy as are wire leads 79 extending inwardly from the winding 74 to an enlarged channel 80 in the transducer body. The enlarged channel has a top wall 81 which extends only partially radially inward to a rearwardly opening slot 82 which extends upwardly to the top reference wall 40 of the body 77.

Figure 2:
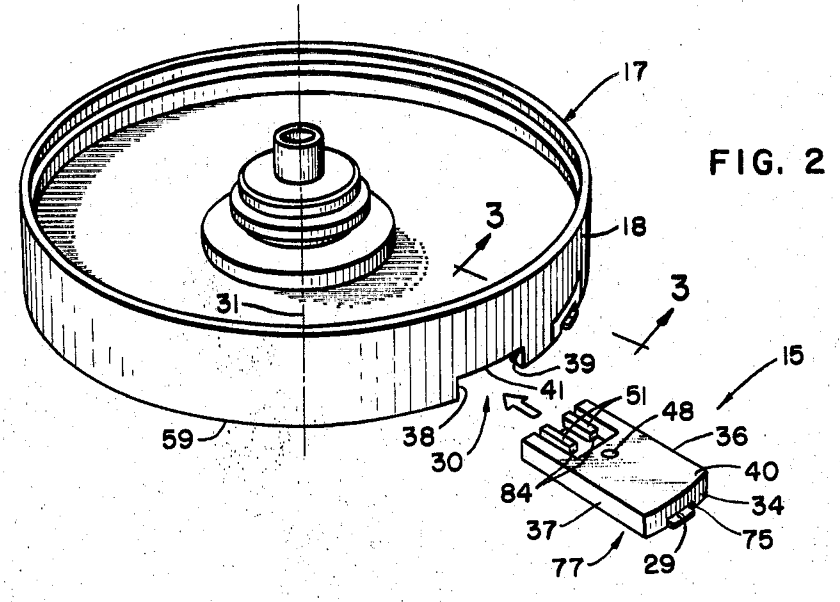
FIG. 2 is an enlarged, perspective view of a rotatable drum and transducer head assembly embodying the novel features of the invention.

As best seen in FIGS. 2 and 3, the two receiver connectors 51 on the transducing head 15 for connection to two parallel radially extending pin connectors 49 are disposed within the upwardly opening slot 82 in the transducer head body 77 and are fastened to the upper side of a printed circuit board 83 which is adhered to bottom wall 81 of the enlarged channel 80 in the transducer body. The connectors 51 include two upper hollow tubular members 84 to receive the pins 49 and, as illustrated in FIG. 3, metal prongs 85 extend through the printed circuit board 83 to a pair of printed circuit leads 87 which are on the underside of the board and are connected at inner ends thereof to the receiver connectors 51 and are connected at their outer ends to the respective leads 79 from the pole pieces 71 and 72. Thus, it can be seen that the electrical connection can readily be made with the radial sliding of the transducer head to bring the receiver connectors 51 into engagement with the projecting pins 49 which slide radially within the receivers.

For the purpose of locating the transducer head 15, it is preferably formed with its body 77 made of metal accurately machined to provide reference surfaces side walls 35, 36 and 40 for sliding an intimate contact with similar reference surfaces in the slot 30 of the rotatable scanner drum 17. More specifically, the illustrated slidable body 77 is formed with planar, parallel side walls 36 and 37 spaced apart at relatively close dimensional tolerances such as, for example, spaced at 0.467 inch within a tolerance of −0.000 and +0.001 inch. To facilitate the sliding of these side walls within the slot 30 in the drum, the upper edges of these side walls 36 and 37 are chamferred where they join top reference surface wall 40. Top reference surface wall 40 is flat and in a plane substantially normal to the planes of the side walls 36 and 37.

The angular location of the transducer head 15 is exactly located by the angular location of the slot 30 on the scanning drum 17 which has the spaced parallel reference surfaces 38 and 39 spaced apart only a few thousandths of an inch wider than the width of the slidable body 77 between its parallel side walls 36 and 37. In this instance the slot 30 is downwardly opening and extends from the upper flat wall 41 to the lower rim 59 of the outer circumferential wall for the drum. The top reference surface is machined in a plane perpendicular to the rotational axis 31 of the drum and the parallel side walls 38 and 39 of the slot are machined parallel to each other.

To accurately hold and locate the transducer head 15 in this position while the scanning drum 17 is turning at a relatively high speed, the slot 30 preferably extends inwardly considerably beyond the usual 3/16 inch thickness for the cylindrical wall 18 of the drum. To this end the existing types of drum walls may be provided with an additional arcuately shaped support block 90 (FIG. 4) which is fastened by screws 91 to an underside of a web 93 of the drum which extends between the drum wall 18 and an inner hub 95 for the drum. Thus, the support block is disposed on the interior side of the cylindrical wall 18 and preferably is secured to the underside of the web prior to the machining of the slot 30 so that the slot is continuous through both the support block 90 and the drum wall 18 to define a common receiving slot 30 for the transducer head 15. Alternatively, the drum wall 18 could be made substantially thicker to provide additional reference surface area and support for the slidable plug-in transducer head 15.

To provide long continuous reference surfaces in the support block for engagement with the reference surfaces 36, 37 and 40, the support block is formed with an integral outwardly projecting portion 97 which is received in a complementary groove 99 cut in the inner side of the drum wall 18. The illustrated receiving slot 30 is thus formed in both the outer 0.375 inch drum wall and a 0.500 inch thick support block 90 to provide an overall length which almost approximates the length of the transducer head reference surface walls 36, 37 and 40. Thus, the head may be engaged and maintained throughout substantially its entire length and with its top reference wall 40 disposed substantially perpendicular to the rotational axis 31 of the drum 17. Where the support block 90 is added, suitable counterweights 101 may be positioned and secured to the drum 17 to balance the drum for turning about the rotational axis 31.

As stated above, the transducer head 15 is retained in its radial position with its curved reference wall 34 in alignment with the drum wall by the leaf spring 45 until the screw 44 is tightened. The leaf spring bears on the lower wall 46 of the transducer head to force the same upwardly against the top wall 41 of the slot 30. More specifically, the leaf spring 45 comprises a generally flat spring plate 103 secured to the underside of the support block 90 by three screws 91. A radially outer free end 107 of the leaf spring 45 is bent upwardly to project into the slot 30 and to be flexed downwardly by the bottom wall of an inserted transducer head. Preferably the leaf spring free ends have a downwardly flared lip 109 leading to a curved contact surface 111 which actually engages and slides along the bottom wall of the transducer head. The illustrated spring plate 103 is made of lightweight spring metal with suitable struck-out slots 112 therein between the leaf springs 45.

Because of the frictional and slidable engagement between the walls 38, 39 and 40, of the slot 30 and the side walls 36, 37 and 40 of the transducer head 15, and frictional resistance of the locking means leaf spring 45 against the underside of the transducer head, the transducer head must be given a definite strong push to slide it within the slot 30. With the leaf spring 45 holding the transducer head in position, the locking screw 44 is inserted through a vertical bore 113 in the drum web 93 and the support block 90 to thread into the threaded hole 48 in the transducer head 15. The diameter of the bore 113 is considerably larger than the diameter of the screw so that the screw may be aligned with the screw hole 48 even though the center lines of the bore 113 and screw hole 48 are displaced when the curved walls 18 and 34 are aligned. Tightening of screw head 114 against seat 116 in the web 93 tightly abuts the top surface 40 of the head against the top wall 41 of the slot 30. As the reference surfaces 36 and 37 on the head abut the reference surfaces 38 and 39 of the slot, the head is held against turning and twisting when tightening the screw.

Figure 4:
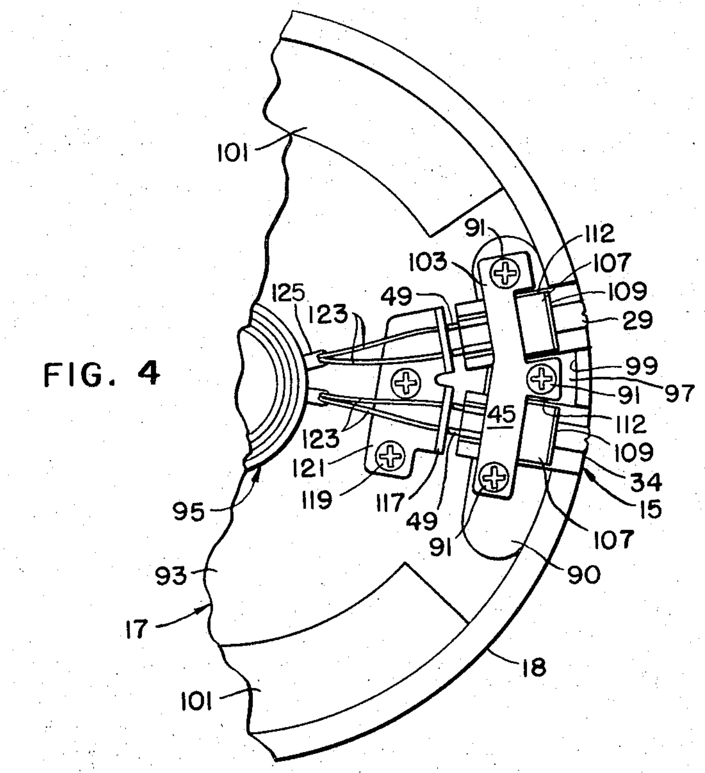
FIG. 4 is an enlarged bottom view of a rotatable drum having a pair of magnetic transducer heads therein and embodying the novel features of the invention.

The pin connectors 49 which are secured to the drum web 93 are preferably mounted in a support bracket 115, as best seen in FIGS. 3 and 4, secured to the underside of the drum web. More specifically, the illustrated brackets 115 have depending flanges 117 in which are secured insulating guide sleeves 119, as best seen in FIG. 3, of plastic extending through apertures in the depending flanges 117 of the brackets. The guide sleeves serve to insulate the connectors from the metallic brackets 115 which are secured to the drum web by means of upwardly extending screws 129 extending through apertures in horizontal flanges 121 of the brackets and threaded into the drum web 93. The radially inward portions of the pin connectors are connected to leads 123 (FIG. 4) which extend radially inward toward the drum hub 95 and then are projected upwardly through openings in the web 93 to a collar device 125 at the hub. Thus, it is possible to have the electrical connection to the head 15 maintained and without the use of flexible wires which will break or which must be soldered by the end user with inserting the new head into position.

In an alternative embodiment of the invention illustrated in FIG. 6, a plug-in transducer head **15*a*, is identical to the transducer head 15 above described except that the reference surface for locating the transducer head radially is in the form of a rear stop wall 130 which slides into the slot 30 to abut an accurately located stop reference surface wall 131 on the drum 17*a*. The drum 17*a* is identical to the drum 17 and hence the other reference surfaces on the drum 17*a* and on the head 15*a*** will not be described. Reference characters with "*a*" suffix are used in FIG. 6 to identify elements identical to those previously described in connection with FIGS. 1–5. The pole tips on the transducer head **15*a* are preset to project a predetermined distance from the rear reference wall 130 rather than from a front curved reference wall as for the transducer head 15 described in the above described embodiment of the invention. Therefore, when the rear reference wall 130 abuts the reference surface wall 131 on the drum, the pole tips will again project at the preset and predetermined distance. In both of these instances, finger pressure may be exerted on the outer curved wall of the head or upon the inner end wall of the head without touching the fragile pole pieces. A locking means 43*a* may be used for holding the transducing head 15*a* and the electrical connection may be made through pin and slot connecting means 47** described above.

From the foregoing, it will be seen that a transducer head may be radially plugged into the scanning drum and quickly aligned with the tip projecting to provide the necessary head-to-tape contact pressure. The end user may readily mount the transducer head without the likelihood of breaking the pole tips. The transducer head may be secured in position without exerting a torque on the head. In any event, the transducing head is held against such twisting movement by engagement of reference surface walls with reference surface walls of the drum. By having the outward curved surface of the head curved at the same radius as the drum cylindrical wall and by having the pole tips preset to project a predetermined distance from this curved surface, it is easy to slide the transducer head inwardly into a precise location without touching or breaking the pole pieces.

Various of the features of the invention are set forth in the appended claims.

We claim as our invention:

1. A magnetic transducing head and drum assembly for use in a magnetic tape recording and reproducing apparatus, said apparatus comprising a drum rotatable about a predetermined axis and having a curved crcumferential wall for engagement with a magnetic tape, a stationary lower drum coaxially mounted with said rotatable drum defining a circumferential gap with said upper drum, said curved tape engaging wall being a first reference surface for positioning said transducer head, said drum having a radially directed slot located at said gap and extending inwardly from said circumferential wall towards said axis, a transducing head insertable into and slidable radially within said slot, a cooperating curved circumferentially extending reference surface on said transducing head for alignment with said tape engaging wall of said drum for precisely locating said transducing head in a position at a predetermined radial distance from said axis, said circumferential wall on said drum and an arcuate outward wall on said transducer head having the same radius of curvature for flush alignment with each other, a pole piece tip fixedly secured on said transducing head and projecting radially outwardly from said reference surface on said transducing head and from said circumferential drum wall for a preset distance when said transducing head is at said predetermined position from said axis, further cooperating reference surfaces on said transducing head and said drum extending inwardly at said slot for slidably engaging said radially slidable transducer head and for locating said transducing head at a predetermined angular position on said drum and in a plane substantially perpendicular to said drum, said further cooperating surfaces comprising a top wall and side walls on said transducing head and a top wall and side walls for said slot, and means to lock said transducing head against movement and to lock said circumferentially extending reference surface on said head in alignment with said tape engaging wall of said drum.

2. An apparatus in accordance with claim 1 in which separable electrical connectors are provided on said transducing head and on said drum for slidable interconnection with sliding insertion of said transducing head into position in said slot.

3. An apparatus in accordance with claim 2 in which said electrical connectors are pin and receiver connectors with the pins projecting substantially radially and for a length to maintain electrical contact with shifting of said transducing head while adjacent to the position in which said curved wall on said transducing head is aligned with said circumferential drum wall.

4. An apparatus in accordance with claim 1 in which said locking means comprises a spring biasing said transducing head upwardly against an overhead reference surface in said slot for temporarily holding said transducing head and a threaded fastener for more permanently securing said transducing head in position on said drum.

* * * * *